Patented Oct. 10, 1939

2,176,026

UNITED STATES PATENT OFFICE 2,176,026

STABILIZATION OF FOOD MATERIALS

Sidney Musher, New York, N. Y., assignor to Musher Foundation Incorporated, New York, N. Y., a corporation of New York No Drawing. Application September 13, 1938, Serial No. 229,664

6 Claims. (Cl. 99—150)

The present invention relates to the stabilization of aqueous food products or of those in substantially aqueous condition subject to oxidative decomposition, and it particularly relates to the stabilization of such products by treating them with the dilute unconcentrated water soluble extract of cereals and grains.

It has been found that fats may be treated by adding thereto oil soluble antioxidant materials such as the crude vegetable oils, lecithin, etc. Fats may also be treated with the substantially oily seed materials such as crushed sesame seed, crushed peanuts, etc., containing large quantities of glyceride oils and/or wherein free oil is released following the macerating or grinding process.

In connection with materials that are substantially aqueous in character, such as egg white, sliced or whole vegetables or fruits, such as sliced potatoes, oranges, sliced peaches, etc., or in connection with emulsified food products where the fats or other similar materials subject to oxidation are in globule or disperse form in an aqueous medium, such as dairy products, mayonnaise, etc., the use of the oily materials described above is limited by reason of their immiscibility with water or aqueous materials, and also by reason of the fact that the aqueous materials cannot be treated with the substantially oily or oil materials and subsequently washed to remove such added materials because of the adhering nature of the oily substances to the products mentioned.

In the case of the oil-free aqueous materials such as vegetables, fruits, etc., the problem of oxidative deterioration as evidenced by discoloration, loss of fresh flavor, etc., is extremely important. In the case of those food products which contain oils in the disperse phase in emulsified form, the oils are usually stabilized or surrounded by protein films. For example, in milk or cream most products derived therefrom, the fat globules always appear to be encircled and protected by protein such as casein which casein extends through the entire mass. The decomposition of the aqueous materials, such as the casein in this instance, or such as the egg yolk in the case of mayonnaise appears to increase or render more susceptible to oxidation the various fats or oils which may also be present in disperse or in globule form, so that in these cases the decomposition of both the continuous aqueous phase and the disperse fat phase must be considered.

It is among the objects of the present invention to provide improved stabilized food or similar compositions existing in aqueous form, without changing the normal appearance or characteristics of the treated product and the stability of which will not be decreased by processing at elevated temperatures, and from which the stabilizing additions may readily be removed during further processing thereof.

Another object is to provide improved food materials having enhanced stability against oxidative deterioration in which the antioxidant material is dispersed in such a way as most satisfactorily to protect the food material.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above results, it has been found satisfactory to use the dilute unconcentrated water soluble extract of the cereals and grains, such as corn, barley, oats, hominy, tapioca, rye, rice, wheat, buckwheat, etc., these materials being used preferably in their unbleached raw and dry milled condition, and desirably in pulverized, ground or flour condition.

This extract is generally prepared by mixing a cereal, preferably in divided form, with water or a water soluble solvent such as brine or other aqueous curing medium, mixing thoroughly in order to remove all the water soluble material, and then removing substantially all the fibrous material by decanting, centrifuging, filtration, or other means.

From 5 to 10 parts by weight of the cereal or grain may be used for every 50 to 500 parts of water or aqueous material and the time of contact with or without agitation may vary from several minutes to one or more hours.

To one pound of cereal, for example, there may be used one gallon of water, for example, or more, dependent upon the degree of concentration desired. Generally, one pound of cereal may be admixed with 2½ gallons of water, this yielding an effective stabilizing medium which can be further diluted if desired.

The extract produced appears to contain a large amount of sugar-like materials and only a small amount of phospholipins and it has a stabilizing effect all out of proportion to the quantity of solids therein. Differing from lecithin, etc., and similar materials it gives greatly enhanced stability when treated at elevated temperatures above 100° C. or preferably above 250° C. in the presence of the protein, fat or other phase to be stabilized.

Although the water solution may be removed, also removing as far as is observable the extract, the various phases are left in stabilized condition.

For example, in the brining of sliced peaches prior to canning the water extract of a cereal may be employed as part of the brine and following the normal brining period, the brine containing the water extract may be washed away, the peaches retaining the protectives originally given to them during the brining.

The extract derived from oats and maize, preferably in raw and unbleached condition, gives the highest yield of stabilizing activity and is far most desirable. The cereals produce the most acceptable extract because of their low oil, and phospholipin content which seems to enhance the production of the extract as contrasted to high oil and phospholipin containing materials in which the antioxidants are not most readily susceptible to water extraction.

In connection with those aqueous materials existing in emulsified form with the oil or fat present in the disperse phase, the dilute unconcentrated water soluble extract of the cereals is markedly effective not only in protecting the casein in the case of milk or the egg yolk in the case of mayonnaise by being dispersed in the aqueous phase of those emulsions, but the extract also surprisingly gives protection to the fat globules as well. This extract, even when used in such small amounts as to stabilize merely the casein or other binder material, also gives stability to the non-aqueous phase.

Instead of using water as a solvent, it is also possible to use an aqueous material such as milk, egg white, brine, or similar product into which the cereal may be placed for purposes of extraction.

Example I

Mayonnaise was prepared containing added water to the extent of 11%. In one set of samples plain water was used and in another set mayonnaise was made under the same conditions and with the same materials except that 5.0% of oat flour was added to the water, allowed to settle and the supernatant water soluble portion removed and added to the mayonnaise in the same amount of 11%. In a third set of samples, 5% of oat flour was added to the water and held in suspension in the water while the water was added without straining to the mayonnaise in its manufacture. Rancidity was determined both organoleptically and by peroxide values with the following results Rancidity observed
after—
Control mayonnaise_____ 35 days
Mayonnaise with water extract of oat
 flour _____ 64 days
Mayonnaise with oat flour_____ 46 days As indicated above the unconcentrated water soluble extract has been found to be a far more effective stabilizer than the original cereal not extracted, in spite of the fact that the residue following extraction still retains some rancidity retarding properties. Not only is the extract efficient at the beginning of the period of decomposition, but it retains its effectiveness over a long period of time and where other stabilizers would fail.

This extract also has the advantage of not changing the normal color, flavor or appearance of the treated food products as is observed when the cereal itself is employed. In the case of mayonnaise, for example, the presence of the cereal would require special labeling and where more highly pigmented cereals are used, the mayonnaise takes on greenish or other undesirable casts.

Concentrated extracts may also be employed, although by concentration a loss in protective action may be observed. Although the extract should preferably therefore be retained in its original form after extraction, it may be further diluted as desired.

In the case of products existing in the form of aqueous emulsions such as egg yolk and which are subsequently dried or dehydrated, the extract should preferably be added to the aqueous phase of the emulsion before dehydration.

With regard to aqueous materials not necessarily existing in emulsified form and for the most part fat free, such as egg albumin or egg white, fruits, etc., the dilute unconcentrated water soluble extract may also be advantageously employed to retard protein decomposition, essential oil oxidation, etc.

Example II

To liquid egg white was added 1% of the unconcentrated water extract of oat flour made from a 15% oat flour water solution. The egg white was then spray dried and compared with spray dried egg white without the water extract, after allowing to stand in closed glass containers in indirect light at room temperature. Scorings for flavor and odor were conducted based upon a perfect score of 25.

|  | At end of 2 months | At end of 4 months |
| --- | --- | --- |
| Control egg white | 19 | 11 |
| Treated egg white | 23 | 18 |

Where dehydration is not generally resorted to, such as in the case of fruits and vegetables, the water extract may be utilized with other aqueous media normally employed. For example, the water extract may be used together with borax in the treatment of oranges or as part of the brining operation in the treatment of apples, etc.

Another advantage that the water soluble extract has over the cereals from which it is extracted is that the extract is not subject to souring which sometimes occurs when the cereal is employed. This is in addition to the much greater degree of protection obtained by the use of the extract than by the use of the original cereal.

The material of the present invention differs remarkably from other oil soluble antioxidant materials, such as for example, lecithin, in that it contains a quantity of carbohydrate material, is not deactivated at elevated temperatures, but even becomes more active when the product with which it is treated is subjected to elevated temperatures, and in addition, the extract described herein has more continued potency and activity for longer periods of time.

Among the less preferred applications of the invention is the treatment of the water used to make dough as in the case of bakery products such as biscuits and crackers.

Example III

Biscuits having a fat content of about 12% were made using lard as the basic fat. The biscuits were tested for organoleptic rancidity twice each week, having been held at room temperature over the test period. The biscuits marked A were made in the normal way; those marked B were made using 1.0% of oat flour against the weight of the dough and incorporated with the flour normally employed; those marked C were made using the water extract of 1.0% of oat flour against the weight of the dough, and added as part of the water addition to the dough in the usual way, before the usual baking procedure at elevated temperature of about 350° F. The following results were obtained:

Biscuits A.—Off flavor after 6 weeks, rancid after 9 weeks.

Biscuits B.—Off flavor after 6½ weeks, rancid after 10½ weeks.

Biscuits C.—Off flavor after 9 weeks, rancid after 15 weeks.

Although the extracts described herein are preferably utilized in connection with aqueous materials, they may also be employed with food materials of non aqueous character, particularly where water is employed at some stage in the processing.

For example, when coffee is quenched following the roasting operation and in order to prevent further roasting due to latent heat, the water extract may be utilized in place of the water normally employed.

*Example IV*

Coffee was roasted as usual and then quenched while the beans were approximately at 400° F., using 10% of water against the weight of the green beans.

A. With water only.
B. With water containing 20% of oat flour.
C. With water containing the unconcentrated water extract of 10% of oat flour.

The coffee was ground and held in bags at room temperature. Scorings were conducted based upon a perfect score of 100.

|  | After 10 days | After 30 days |
|---|---|---|
| Coffee A | 80 | 65 stale. |
| Coffee B | 90 | 75 slightly stale. |
| Coffee C | 95 | 85 fairly good. |

Although by reason of their greater efficiency and potency, the unconcentrated water soluble extract of the cereals should be used, where desired for purposes of shipment of the extract in least bulk form, the water material used as a solvent may be removed by evaporation at atmospheric pressure or preferably under vacuum, for example of 5 to 25 inches and at a low temperature below the boiling point of water, say 150 to 200° F. and the concentrated material may subsequently be used. The evaporating or drying process tends to reduce the stabilizing action of the extract, so that preferably the concentration should not exceed about 50%. An atmosphere of nitrogen or carbon dioxide may be used during the concentration and storage of the concentrated product. The concentrated extract after removal of the solvent will char when heated to temperatures in excess of 250° F., but this will in no way affect its stabilizing properties, but on the other hand, will tend to increase its potency as a stabilizer.

Since alcohol is a water soluble material it may also be employed to produce a stabilizer, the protective properties of which will not be reduced at elevated temperatures and which stabilizer will in a large measure be water soluble. Alcohols such as ethyl alcohol or other lower alkanols, sugars and glycerols may be used under the same conditions as in the case of water. Although the alcohol soluble type of extract may be employed under this invention, it is found most satisfactory to use the unconcentrated water soluble extract first described.

Under certain conditions de-oiled ground materials such as ground peanuts, ground sesame, etc., and less desirably de-oiled soya flour, cottonseed meal, etc., may be extracted with water or aqueous materials, but the extracts obtained are not as desirable as those produced from cereal flours which are low in oil and phospholipin content.

The present application is a continuation in part of applications, Serial Nos. 97,461 filed August 22, 1936 and 107,737 filed October 26, 1938.

The copending application, Serial No. 249,990 filed January 9, 1939 is specifically directed to stabilizing aqueous food materials with a water soluble extract of a finely divided unbleached cereal. The present application is more broadly directed to stabilizing food compositions, whether aqueous or non-aqueous, with either the alcohol or water soluble extracts of the cereals. The specific use of these extracts for stabilizing meat and fishery products is covered in application, Serial No. 229,296 filed September 10, 1938.

Having described my invention, what I claim is:

1. A food composition subject to oxidative deterioration carrying a relatively small amount of an extract of a finely divided unbleached cereal, said extract selected from the group consisting of the water and alcohol soluble extracts, said extract retarding oxidative deterioration of the composition.

2. A food composition subject to oxidative deterioration carrying a relatively small amount of an extract of a finely divided unbleached cereal selected from the group consisting of oats and maize, said extract selected from the group consisting of the water and alcohol soluble extracts, said extract retarding oxidative deterioration of the composition.

3. A process of stabilizing food materials against oxidative deterioration which comprises adding thereto a relatively small amount of an extract of a finely divided unbleached cereal, said extract being selected from the group consisting of the water and alcohol soluble extracts.

4. A process of stabilizing food compositions against oxidative deterioration which comprises adding thereto a relatively small amount of an extract of a finely divided unbleached cereal selected from the group consisting of oats and maize, said extract being selected from the group consisting of the water and alcohol soluble extracts.

5. A food composition subject to oxidative deterioration carrying a relatively small amount of a water soluble extract of an antioxygenic unbleached cereal, said extract retarding oxidative deterioration of the composition.

6. A process of stabilizing food materials against oxidative deterioration which comprises adding thereto a relatively small amount of a water soluble extract of an antioxygenic unbleached cereal.

SIDNEY MUSHER.